May 16, 1944.  D. G. TAYLOR  2,349,209
CONTROL DEVICE
Filed April 26, 1941

Inventor
Daniel G. Taylor
By George H. Fisher
Attorney

Patented May 16, 1944

2,349,209

UNITED STATES PATENT OFFICE 2,349,209

CONTROL DEVICE

Daniel G. Taylor, Minneapolis, Minn., assignor to Minneapolis-Honeywell Regulator Company, Minneapolis, Minn., a corporation of Delaware Application April 26, 1941, Serial No. 390,553

15 Claims. (Cl. 137—139)

The present invention relates generally to automatic control devices, and more particularly to devices for automatically controlling pressure operated valves.

It is old in the prior art to control the pressure on a diaphragm valve by means of an electromagnetically operated pilot valve. Many of these devices are rather complicated and difficult to manufacture and assemble. One of the objects of this invention is to simplify the construction of such devices with a view to decreasing the cost of manufacture and increasing the ease of assembly and efficiency of operation.

A further object of the invention is to control a diaphragm gas valve by means of a unitary pilot valve assembly mounted directly on the body of the gas valve, the pilot valve assembly being actuated by an electromagnet also mounted on the gas valve body, and to provide sealing means for sealing the pilot valve from the electromagnet.

A still further object is to provide the device with a mechanical limit control mounted on the gas valve body for actuating the pilot valve independently of the electromagnet to cause closure of the main gas valve.

Still another object is to provide the armature of the electromagnet with a manual operator for actuating the armature in the event of a power failure, and where the mechanical limit control is used to provide for its being operative to perform its limiting function independently of the manual operator.

Manual devices for operating armatures of electromagnets during periods of power failure are old in the art. Such devices are usually biased to inoperative position and are manually actuated and then maintained in their operative positions by friction devices or latches which are released automatically upon reenergization of the electromagnet. It is an object of this invention to provide such a manual device in the form of an over-center toggle mechanism, the over-center action of the toggle in combination with the unattracted armature of the electromagnet acting to maintain the device in its operative position, but being released for movement to its inoperative position upon reenergization of the electromagnet. The manual device closes the usual recycling contacts on movement to operative position so that on resumption of power the electromagnet will be reenergized to release the manual device regardless of the condition of the switch which is normally in control of the circuit to the electromagnet.

Figure 2:
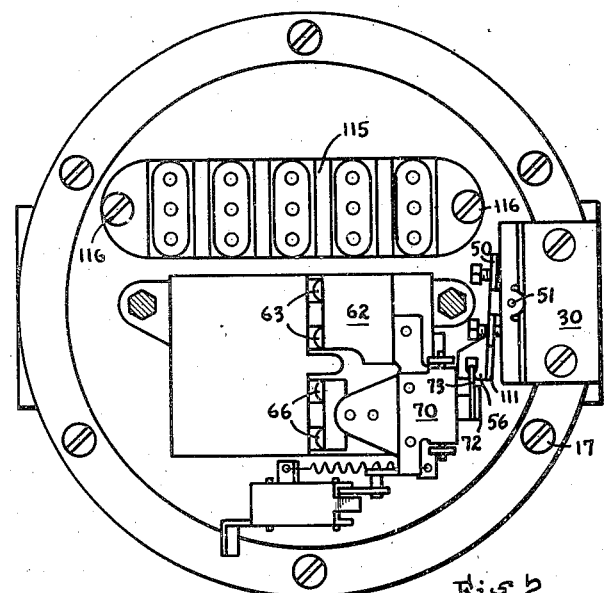
Figure 4:
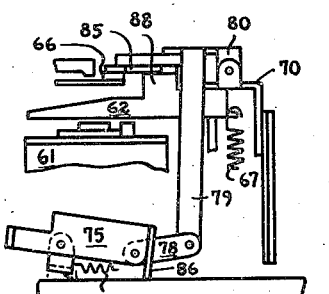
Figure 3:
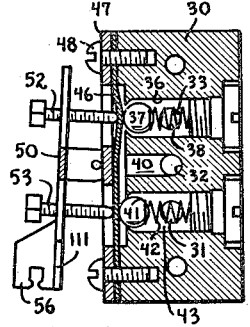
Figure 1:
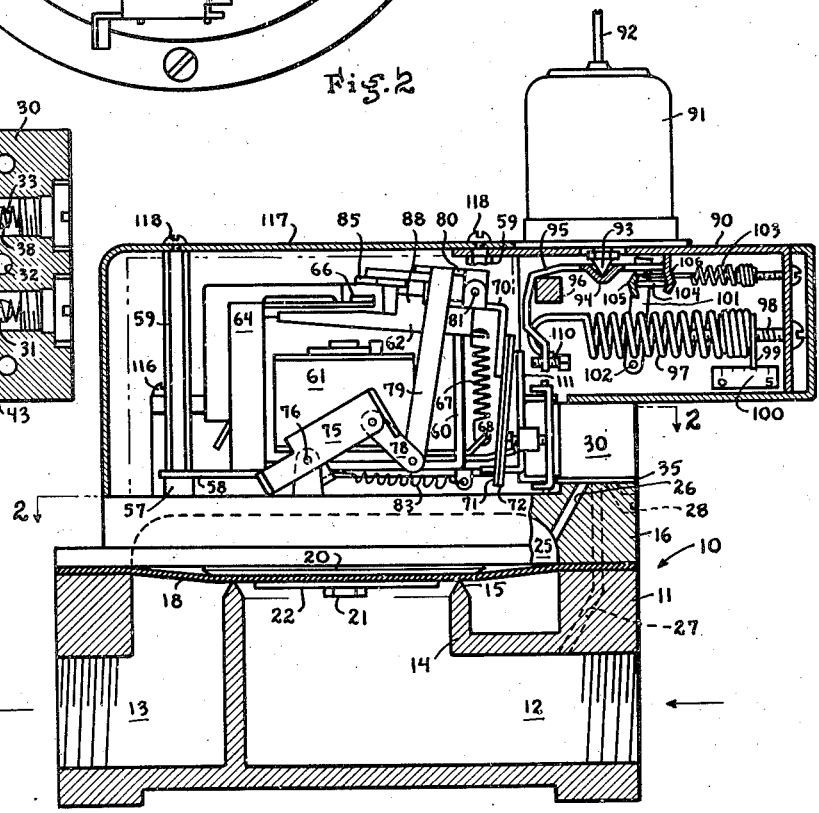

These and other objects will readily occur to those skilled in the art as the following specification is read in the light of the accompanying drawing in which Figure 1 is a side view of a diaphragm gas valve embodying my invention and showing the mechanical limit control in place, parts being shown in section;

Figure 2 is a plan view of the device shown in Figure 1 with the cover removed and without the mechanical limit control, Figure 3 is a detailed sectional view of the unitary pilot valve assembly, and Figure 4 is a detailed view of the manual operator for the pilot valve, the parts being shown in operative position.

Referring now to Figure 1, the reference numeral 10 indicates generally a diaphragm gas valve which comprises a lower valve body 11, generally circular in outline, and having a gas inlet chamber 12 and a gas outlet chamber 13. The inlet and outlet chambers are separated by means of a partition 14 having a valve opening surrounded by an annular valve seat 15. The upper valve body 16 is circular in shape to conform with the lower valve body and is suitably secured thereto by any means, such as screws 17. A circular diaphragm 18 is clamped between the two valve bodies 11 and 16 to form a seal. This diaphragm is adapted to cooperate with the valve seat 15 for controlling gas flow through the body 11, and is provided on its upper surface with a backing plate 20 which is suitably secured thereto by means of a stem and nut 21 and a washer 22.

The lower portion of the upper valve body 16 is hollowed out to form a pressure chamber 25, one wall of which is formed by the diaphragm 18. A passageway 26 connects with the pressure chamber 25 and extends through the upper surface of the valve body 16. The lower valve body 11 is provided with a passageway 27, indicated in dotted lines, which connects with the inlet gas chamber 12 and extends through the upper surface of the valve body 11 and also through the diaphragm 18 and through the upper surface of the upper valve body 16. A third passageway shown in dotted lines at 28 extends through the upper surface of the valve body 16 and through the sidewall thereof.

A unitary pilot valve assembly indicated generally at 30 is provided with three openings through its base as indicated at 31, 32 and 33 in the sectional view shown in Figure 3. This pilot valve assembly 30 is mounted upon the upper surface of the valve body 16 so that the opening 31 registers with the passageway 28, the opening 32 registers with the passageway 26 and the opening 33 registers with the passageway 27. The pilot valve assembly is suitably secured to the valve body 16 by any means, not shown, and is sealed with respect thereto by means of the gasket 35. Referring to Figure 3, it will be seen that this pilot valve assembly is provided with a chamber 36 which communicates through opening 33 with passage 27 and hence the inlet chamber of the lower valve body and will therefore be termed the inlet chamber of the pilot valve assembly. The ball valve 37 is biased by means of a spring 38 toward its seat, but when moved to open position permits a flow of gas from the inlet chamber 36 to a chamber 40 which communicates through the opening 32 with passageway 26 and the pressure chamber 25 above the diaphragm 18. The ball valve 41 is biased to its seat by means of the spring 42, but when in open position provides for communication, through the opening 31, between the chamber 40 and the outlet chamber 43 which communicates with the atmosphere through the passageway 28. If desired, the waste gas issuing from time to time from the outlet end of the passageway 28 may be conducted to the main or pilot burner where it will be consumed.

The chamber 40 is sealed from the atmosphere by means of a flexible diaphragm 46 which is suitably clamped to the pilot valve assembly 30 by any suitable means such as the frame 47 and screws 48. The rocker 50 is pivoted to the frame 47 as shown at 51. The rocker 50 carries adjustable screws 52 and 53 whose stems extend inwardly toward the pilot valve assembly and engage the diaphragm 46 through openings in the frame 47 for actuating the ball valves 37 and 41. The rocker and actuating screws 52 and 53 are so arranged that when the rocker assumes a mid-position both of the valves 37 and 41 are closed whereby the pressure within the pressure chamber 25 remains at a steady value. When the rocker 50 is rotated slightly in a clockwise direction from mid-position to the position shown in Figure 3, the actuating screw 52 forces the ball valve 37 away from its seat at which time gas can pass from the inlet chamber 12 through the passageway 27 to chamber 36 and hence via chamber 40 and passageway 26 into the pressure chamber 25. At this time the pressure above and below the diaphragm 18 will be approximately the same and the diaphragm will therefore fall to the seat 15 by gravity. Inasmuch as the outlet chamber 13 is adapted to be connected to a burner, the pressure in this chamber will decrease to atmospheric pressure with the result that the pressure in the chamber 25 will now hold the diaphragm firmly on its seat. If the rocker 50 is now rotated in a counter-clockwise direction it will permit the biasing spring 38 to close valve 37 thereby closing off the communication between the pressure chamber 25 and the inlet chamber 12, and force the valve 41 from its seat, which will establish communication between the pressure chamber 25 and the atmosphere via the passageway 26, chamber 40, outlet chamber 43 and passageway 28. This will reduce the pressure in the chamber 25 to atmospheric pressure permitting the gas pressure within the inlet chamber 12 to force the diaphragm 18 upwardly and raise it from the seat 15, thereby establishing maximum flow of gas through the body 11.

The rocker 50 is adapted to be actuated automatically by means of an electromagnet and is therefore provided with a slotted extension 56. The upper face of the valve body 16 is provided with a pair of internally threaded projections 57 which support a plate 58. The lower threaded end of the hexagonal supporting members 59 extend through holes in the plate 58 and into the tapped projection 57 to secure the plate thereto. The plate 58 suitably carries a L-shaped bracket 60 upon which is mounted the electromagnet 61. An armature 62 is pivotally mounted on the upper end of the bracket 60, and if desired, may carry an electrical bridging blade, not shown, for bridging the two stationary contacts 63, shown in Figure 2, when the electromagnet is energized. The contacts 63 are mounted upon the ends of resilient contact strips which are suitably supported in the insulating bracket 64. A second pair of electrical contacts 66 may be supported in the same manner. The armature is biased to its raised or unattracted position by means of the tension spring 67 which engages in the armature 62 at its upper end and to a fixed projection 68 at its lower end.

Suitably secured to the armature 62 is a bracket 70 which extends downwardly and carries a resilient blade 71 and a stiff backing member 72. The resilient blade 71 is biased against the member 72 and is provided with a laterally extending foot 73 which extends within the slot in the slotted member 56.

As the electromagnet 61 is energized the armature 62 is pulled downwardly so that the resilient blade 71 is moved to the right as seen in Figures 1 and 2, thereby rotating the rocker 50 in a counter-clockwise direction as seen in Figures 2 and 3 which will result in the opening of valve 41 and closing of valve 37 to reduce the pressure in chamber 25 and open the main diaphragm gas valve. When the electromagnet is deenergized the rocker 50 is returned to the position shown in Figures 2 and 3 in which the valve 37 is open and the valve 41 closed with the result that the main diaphragm valve is closed. The stationary contacts 63 may be used, if desired, to close a holding circuit through a bimetallic thermostat in control of the circuit to the electromagnet where this thermostat is of the type used, for example, in the Denison Patent 1,607,392. The stationary contacts 66 are recycling contacts which are used in connection with the manual operator for the pilot valve which will now be described.

Obviously if the power supply to the electromagnet should fail, the armature 62 would drop out and move the pilot valve assembly to the position shown in Figure 3, causing the closure of the main diaphragm valve. If it is desired to open the main valve during such power failure, some manual means for accomplishing this must be provided. In the present device this manual means takes the form of a lever 75 which is pivotally mounted at 76 to a projection on the upper valve body 16. The link 78 is pivotally connected at one end of the lever 75 and at the other end to a connecting leg 79 which extends downwardly from a bracket 80 pivotally connected at 81 to the bracket 70 on the armature 62. Tension spring 83 is connected at its left hand end to a downwardly extending ear on the lever 75 and its other end to an ear on the plate 58. The spring 83 therefore biases the lever 75 for rotation in a counter-clockwise direction, this rotation being limited by the engagement of the left hand end of lever 75 with the face of the valve body 16 as shown in Figure 1. It will be recalled that the bracket 10 is fixed to the armature 62 and therefore the energization and deenergization of the electromagnet 61 and the subsequent movement of the armature 62 will cause a slight movement of the bracket 80 but not enough to cause the bridging member 85 to bridge the stationary contacts 66. If it is desired to manually actuate the pilot valve assembly during a power failure, the operator has only to lift the left hand end of the lever 75 and move this lever over-center with respect to the link 78 to a position shown in Figure 4 and the extent of this movement is limited by the extension 86 which engages the upper face of the valve body 16. This movement causes the bracket 80 to rotate in a counter-clockwise direction at which time the bridging member 85 strikes the projection 88 on the armature 62 and rotates the armature in a counter-clockwise direction, thus causing it to rotate the rocker 50 and open valve 41 and close valve 37, which will of course result in the opening of the main gas valve. It will be remembered that the armature 62 is biased to its unattracted position by means of the spring 67 and that the effect of this spring is to tend to rotate the armature and the bracket 80 in a clockwise direction from that shown in Figure 4 with the result that the connecting leg 79 exerts an endwise force on the link 78 toward the left. The effect of this force is to prevent spring 83 from returning the lever 75. In other words, the biasing spring 83 is tending to rotate the lever 75 back to the position shown in Figure 1 but the biasing spring 67 exerts a force on the link 78 preventing spring 83 from moving lever 75 over-center with respect to the link 78. The parts therefore remain locked in the position shown in Figure 4 and the diaphragm valve remains open.

This rotation of the lever 75 to the position shown in Figure 4 is sufficient to cause the bridging member 85 to electrically connect stationary contacts 66. These contacts form the usual recycling switch which close a shunt circuit to the electromagnet to provide for its immediate energization upon resumption of electrical power. When power is resumed the electromagnet 61 will therefore be energized and the parts are so arranged that this energization is capable of causing a slight additional counter-clockwise movement of the armature 62 which additionally tensions the spring 67. It will be noted that now the electromagnet, and not the toggle mechanism, is holding the spring 67 in its tensioned condition. This removes the bias from the bracket 80 and allows the biasing spring 83 to return the lever 75 to the position shown in Figure 1. To state it differently, as long as there is no power on the electromagnet 61 the toggle mechanism formed by the lever 75 and the link 78 must hold the spring 67 in its tensioned condition, but as soon as power is resumed the electromagnet 61 is operative to tension the spring 67 and therefore the toggle mechanism is relieved of this work, the force having been removed from the link 78. The biasing spring 83 is operative to return the lever 75 to its original position, the recycling switch 66 is opened and the device returns to the control of the switch which normally controls energization of the electromagnet 61.

If desired, a mechanical limit control may be added to the device described above. This mechanical limit control may take the form of a housing 90 which fits over the pilot valve assembly 30 and is supported by the upper face of the valve body 16 and has an extension which cooperates with one of the supports 59. The housing 90 is provided with a bellows assembly 91 having a capillary tube 92 for connection with either a source of variable pressure or with a bulb containing a thermally sensitive fluid. The usual bellows is located within the casing 91 for actuating the stem 93. The stem 93 is adapted to engage in a dwell 94 in an actuating lever 95 pivotally supported on a knife edge 96. The lever 95 is biased by means of a main adjusting spring 97 attached to a suitable adjusting screw 98 and having a pointer 99 cooperating with a scale 100 for indicating the temperature or pressure value at which the lever 95 will be actuated. If it is desired that this lever 95 operate the pilot valve mechanism rapidly from one position to another, it is necessary that a snap action mechanism be provided. Such mechanism has been shown in Figure 1 and comprises a lever 101 pivoted to the housing 90 at 102. Adjustable spring 103 biases the lever 101 for rotation in a clockwise direction. A link 104 is located between an extension 105 on the lever 101 and an extension 106 on the lever 95. As the stem 93 moves downwardly and rotates the lever 95 in a clockwise direction, it will result in a rotation of the link 104 with the result that the spring 103 will exert a force on the lever 95 through the link 104 at such an angle that it will tend to rotate the lever 95 in a clockwise direction. If the effect of the spring 103 on the lever 95 is made sufficiently great to over compensate the combined spring rates of the bellows and springs 97 and 103, then the movement of the lever 95 will take the place with a snap action. On a decrease in pressure within the bellows housing 91 the lever 95 will be snapped in the opposite direction. The theory of producing a snap action by over compensating the spring rate of an actuating bellows is an old and well known type of action and will therefore not be described further.

The lower end of the lever 95 is provided with an adjustable screw 110 which is adapted to engage an extension 111 on the rocker 50 when the lever 95 is snapped to its clockwise position. This results in a movement of the rocker to the position shown in Figures 2 and 3. If the armature 62 should be in its attracted position or if the manual lever 75 should be in its operative position at the time the lever 95 is snapped, then the resilient blade 71 carried by the bracket 70 is merely pressed back to relieve the strain in the connection between the rocker 50 and the armature 62. The limit control lever 95 is always operative to actuate the pilot valve assembly in a manner to close the main diaphragm valve regardless of the position of the manual lever 75 or the armature 62. The purpose of this is to provide a safe limit control which can always close the main gas valve in case a dangerous condition is found to exist in the system heated by the main gas burner.

It will be understood that the diaphragm valve with its pilot valve assembly and electromagnetic actuator therefor may be used without the manual operator 75 or the mechanical limit control 90. Furthermore, it will be understood that either the mechanical limit control alone or the manual operator 75 alone may be used in combination with the diaphragm valve, pilot valve and electromagnet, or if desired, both the manual operator and the mechanical limit controller may be used on the assembly.

An insulated panel 115 is shown as being mounted on suitable projections on the valve body 16 by means of the screws 116. This panel may be provided for making suitable electrical connections to the electromagnet as well as the recycling contacts 66. Also the device may be provided with a cover which is shown at 117 in Figure 1 which may be fastened on by means of the screws 118 which extend into the supporting members 59. Where the mechanical limit control is used the screw 118 may also assist in fastening the housing 90 to one of the supports 59.

Various changes and modifications in the above device will undoubtedly occur to those who are skilled in the art, and I therefore desire to be limited by the scope of the appended claims rather than by the specific embodiment which has been disclosed for the purposes of illustration only.

I claim as my invention:

1. In a control device, a first rotatably mounted member, a second rotatably mounted member pivotally connected to and adapted to be rotated by said first member, means biasing said members for rotation to a first position, said first member being rotatable over center with respect to said second member to a second position, means opposing said biasing means to prevent the return of said members to said first position, and electromagnetic means which when energized renders said opposing means inoperative whereby said biasing means returns said members to their first position.

2. In a device of the character described, a control device, an electromagnet actuating said device to a first position when energized and to a second position when deenergized, manual means including an over center toggle mechanism biased to inoperative position but manually actuable over center to its operative position in which it actuates said device to its first position when said electromagnet is deenergized, means operative so long as said electromagnet is deenergized to oppose the bias on said manual means and prevent it from returning to inoperative position, said electromagnet, upon energization, rendering said opposing means inoperative whereby said manual means returns to its inoperative position, and means operative to actuate said control device to its second position independently of either said electromagnet or said manual means.

3. In a device of the character described, an electromagnet, an armature therefor, spring means biasing said armature to its unattracted position, a pivotally mounted lever, a link connected to said lever to form a toggle, a second spring means biasing said lever to a first position, means operatively connecting said link and armature whereby, upon a failure of power to said electromagnet, said lever may be manually rotated over center with respect to said link and against the action of said second spring means to move said armature toward its attracted position, and said first spring means exerting a longitudinal force on said link through said armature and connecting means, the effect of said force being to prevent said second spring means from rotating said lever over center to its original position, said electromagnet, upon reenergization, attracting said armature and removing the force of said first spring means on said link whereby said lever is released for movement under the influence of second spring means.

4. In a device of the character described, an electromagnet, an armature therefor, spring means biasing said armature to its unattracted position, a pivotally mounted, manually operable lever, a link connected to said lever to form a toggle, a second spring means biasing said lever to a first position, means operatively connecting said link and armature whereby, upon a failure of power to said electromagnet, said lever may be manually rotated over center with respect to said link and against the action of said second spring means to move said armature toward its attracted position, said first spring means exerting a longitudinal force on said link through said armature and connecting means, the effect of said force being to prevent said second spring means from rotating said lever over center to its original position, said electromagnet, upon reenergization, attracting said armature and removing the force of said first spring means on said link whereby said lever is released for movement under the influence of second spring means, a control device actuated to a first operative position by said armature when it is in its unattracted position, and to a second operative position when said armature is moved by said manual lever or as a result of attraction by said electromagnet, and means operative to actuate said control device to its first operative position independently of said electromagnet and manually operated lever.

5. In a device of the character described, an electromagnet, an armature therefor biased to its unattracted position, manual means for moving said armature towards its attracted position during periods when said electromagnet is deenergized, said manual means comprising a toggle mechanism biased to an inoperative position on one side of dead center and being movable manually to an operative position on the other side of dead center, the toggle mechanism being constructed and arranged so that the bias tends to return it to inoperative position when on said other side of dead center the biased armature being so constructed and arranged in mechanical relation with the toggle mechanism to prevent the return of said toggle mechanism due to its own bias.

6. In a device of the character described, an electromagnet, an armature therefor biased to its unattracted position, manual means for moving said armature towards its attracted position during periods when said electromagnet is deenergized, said manual means comprising a toggle mechanism biased to an inoperative position on one side of dead center and being movable manually to an operative position on the other side of dead center, the toggle mechanism being constructed and arranged so that the bias tends to return it to inoperative position when on said other side of dead center the biased armature being so constructed and arranged in mechanical relation with the toggle mechanism to prevent the return of said toggle mechanism due to its own bias, a control device actuated to a first operative position by said armature when it is in its unattracted position, and to a second operative position when said armature is moved by said manual lever or as a result of attraction by said electromagnet, and means operative to actuate said control device to its first operative position independently of said electromagnet and manually operated lever.

7. A pilot valve mechanism for a pressure operated valve comprising in combination, a pilot valve, an electromagnet comprising an armature, a strain release connection between said armature and said pilot valve, a bellows adapted to form an element of a condition responsive assembly, and a connection between said bellows and said pilot valve independent of said strain release connection so that said bellows can move said pilot valve independently of said electromagnet.

8. A pilot valve mechanism for a pressure operated valve comprising in combination, a pilot valve, an electromagnet comprising an armature, a strain release connection between said armature and said pilot valve, manual means for operating said armature to operate said pilot valve in the event of a failure of power to said electromagnet, a bellows adapted to form an element of a condition responsive assembly, and a connection between said bellows and said pilot valve independent of said strain release connection so that said bellows can move said pilot valve independently of said electromagnet and said manual means.

9. A pilot valve mechanism for a pressure operated valve comprising in combination, a pilot valve, an electromagnet comprising an armature, a strain release connection between said armature and said pilot valve, a bellows adapted to form an element of a condition responsive assembly, and snap action mechanism connecting said bellows to said pilot valve independently of said strain release connection so that said bellows can move said pilot valve independently of said electromagnet.

10. In a pilot valve mechanism adapted for use with a pressure responsive motor means including a pressure chamber and a diaphragm forming one wall of said pressure chamber, a unitary supply and waste valve assembly comprising a valve housing, supply and waste valves in said housing, a first passage adapted to extend from a fluid source to said supply valve, a second passage adapted to connect said pressure chamber with both said supply and waste valves, a rockable member for actuating said supply and waste valves, said member having a first position in which said supply valve is closed and said waste valve is open for venting said pressure chamber, and a second position in which said waste valve is closed and said supply valve is open for connecting said pressure chamber with said fluid source, diaphragm means sealing said supply and waste valves with respect to said rocker, a first means mechanically actuating said rocker from one of its positions to the other, and a second means for mechanically moving said rocker into one of its positions without affecting the position of the first means.

11. A pilot valve mechanism adapted for controlling a pressure responsive motor means including a pressure chamber, said valve mechanism being mounted in a unitary housing, supply and waste valves in said housing, a rockable member for actuating said supply and waste valves, said member having a first position in which said supply valve is closed and said waste valve is open, and a second position in which said waste valve is closed and said supply valve is open, diaphragm means sealing said supply and waste valves with respect to said rocker, an electromagnet mounted adjacent said valve housing, an armature therefor, connecting means between said armature and rocker whereby said armature when attracted by said magnet causes said rocker to assume one of its positions, and when not attracted causes said rocker to assume its other position, and means operative to move said rocker to its said other position independently of said armature while said armature is in its attracted position.

12. A pilot valve mechanism adapted for controlling a pressure responsive motor, said valve mechanism being adapted to be mounted in a unitary housing, supply and waste valves in said housing, a rockable member for actuating said supply and waste valves, said member having a first position in which said supply valve is closed and said waste valve is open, and a second position in which said waste valve is closed and said supply valve is open, diaphragm means sealing said supply and waste valves with respect to said rocker, an electromagnet mounted adjacent said valve housing, an armature therefor, connecting means between said armature and rocker whereby said armature when attracted by said magnet causes said rocker to assume one of its positions, and when not attracted causes said rocker to assume its other position, manual means for moving the rocker to its said one position in the event of the failure of electrical power for said electromagnet, and means for releasably retaining said rocker in its said one position, said electromagnet releasing said retaining means upon the return of electrical power.

13. In a control device, a unitary supply and waste valve assembly system comprising a valve housing having a base, a supply chamber, a vented chamber, and a controlled chamber in said housing, a supply valve in said housing and controlling flow from said supply to said controlled chamber, a waste valve in said housing and controlling flow from said controlled to said vented chamber, a rocker mounted on said housing, diaphragm means sealing the chambers in said housing from said rocker, a first means for mechanically moving said rocker back and forth between a first position in which said supply valve is closed and said waste valve open to connect said pressure and vented chambers, and a second position in which said waste valve is closed and said supply valve open to connect said fluid source and pressure chambers, and a second means capable of moving said rocker mechanically to one of its positions without affecting the position of said first means.

14. In a mechanism for controlling a pressure responsive motor having a pressure chamber, supply and waste valves adapted for controlling the alternate supply and waste of fluid to and from said pressure chamber, a rocker arm for actuating said supply and waste valves, diaphragm means sealing said valves with respect to said rocker, first means mechanically controlling movement of said rocker between a first position in which said supply valve is open and waste valve closed and a second position in which said supply valve is closed and waste valve open, and second means for mechanically moving said rocker to one of its positions without affecting the position of said first means.

15. A pilot valve mechanism adapted for controlling a pressure responsive motor means including a pressure chamber and a diaphragm forming one wall of said pressure chamber, said mechanism comprising a pilot valve means and an electromagnet comprising an armature, a strain release connection between said armature and said pilot valve means and normally effective when said armature is moved to energized position to move said pilot valve means from a first controlling position to a second controlling position, and means for actuating said pilot valve means to said first position while said electromagnet is energized without affecting the position of said armature, said last named means being operable on said pilot valve means independently of said strain release connection.

DANIEL G. TAYLOR.